Jan. 25, 1966 F. J. BINGLEY 3,231,667

COLOR TELEVISION SYSTEMS

Filed May 10, 1951 2 Sheets-Sheet 1

INVENTOR.
FRANK J. BINGLEY
BY
Allen V. Hazeltine
ATTORNEY

INVENTOR.
FRANK J. BINGLEY
BY
Allen V. Hazeltine
ATTORNEY

United States Patent Office 3,231,667

Patented Jan. 25, 1966

3,231,667

COLOR TELEVISION SYSTEMS

Frank J. Bingley, Meadowbrook, Pa., assignor, by mesne assignments, to Philco Corporation, Philadelphia, Pa., a corporation of Delaware Filed May 10, 1951, Ser. No. 225,567
12 Claims. (Cl. 178—5.4)

The present invention relates to electrical systems and more particularly to color television systems in which signals representative of the color components of the light emitted by the image to be televised are transmitted in so-called "dot sequential" or simultaneous arrangement.

In the heretofore proposed dot sequential systems for transmitting a color television image, the image to be transmitted is analyzed dot-by-dot by means of a sampling technique producing a series of pulses of video signal energy with the amplitude of each such pulse being determined by the ordinate of the color signal at the precise instant at which the pulse is developed. For example, three component color signals may be respectively developed by three separate camera tubes and the signal which is produced by each of the camera tubes, and which is continuously present, is sampled in some preferred manner so as to yield a component-color pulse train. By means of multiplexing, the three component-color pulse trains are interleaved into a composite-color pulse train.

Since in the transmitted video signal, the color information is sampled at equal time intervals each color component in effect utilizes one-third of the available transmission facilities.

It has been found that physiologically, the human eye is relatively insensitive to color in fine areas. In other words it seems that the eye is less sensitive to changes in chromaticity than to changes in brightness and thus requires less information pertaining to chromaticity. Because of this behavior peculiar to the eye, an equal utilization of the transmission channel by each of three primary color component signals making up the image signal is not a most efficient utilization of the channel. More particularly, if it be assumed that the color television information is to be transmitted over a channel which has a bandwidth of 4 mc./sec., an equal utilization of this channel by the three primary color component signals would mean that each component signal contains information corresponding to a frequency band having a maximum value of approximately 1.35 mc./sec. Such a frequency band, when considered in relation to present transmission standards of 30 pictures per second, corresponds to a picture definition with approximately 89,000 picture elements. On the basis of brightness information resolvable by the eye, this degree of definition is considerably below that necessary to produce an acceptable image at the television receiver. On the other hand on the basis of chromaticity information resolvable by the eye this degree of definition is greater than that necessary to satisfy the eye.

It has been proposed to increase the amount of information transmitted in detail brightness and correspondingly reduce the amount of information transmitted in chromaticity by means of the so-called "mixed high" principles whereby all of those components of the color signals above a given predetermined crossover frequency are combined and transmitted as a composite signal defining the detail of the image and those components below the crossover frequency are sampled in a sequential manner as above described to produce a composite signal defining the chromaticity of the image. The composite signals so produced may be combined and the combined signal, after being filtered by a suitable low pass filter, is transmitted in any suitable manner.

From a consideration thereof, it appears that the sampling process is effectively a modulation process whereby each of the color signals is converted into a wave having a low frequency component with a spectrum equal to the frequency spectrum of the color signal applied to the sampler and a high frequency component with spectra centered about the fundamental and harmonics of the sampling frequency. Because of the low pass filter above referred to, the spectra centered about the harmonics of the sampling frequency are cancelled so that the net output of the sampler is a low frequency signal and a carrier wave at the sampling frequency modulated by the low frequency signal.

When three color signals are sampled in time symmetrical relationship, the resulting output of the sampler is a low frequency signal made up of the sum of the color signals and a high frequency signal constituted by three carrier waves at the sampling frequency, the carrier waves being arranged in 120° phase relationship and each carrier wave being modulated by one of the color signals. Thus it appears that notwithstanding the sequential nature of the sampling operation, all of the modulation components effectively exist at the same time and therefore the system is effectively a simultaneous system. Accordingly, the samplers may be replaced by an equivalent modulator system suitably energized, i.e., by three sine wave modulators each energized by one of the color components and by one of three suitably phase-displaced modulating signals.

When the mixed high signal is added to the output of the sampling or modulating system the spectrum of the former will overlap the spectrum of the latter to a greater or lesser extent and when a composite wave so constructed is used for energizing a monochrome receiver in a compatible television system, it is found that the black and white image exhibits interference patterns due to the overlapping spectra. Furthermore, because of the manner in which the primary color component signals are generated, their mere combination as above outlined is not usually sufficient to produce a truly panchromatic image and an undesirable amount of detail and contrast is lost in the reproduced monochrome image.

When such a composite wave is used to energize a color image receiver, it is found that the choice of the primary color generating elements of the image reproducer of the receiver is restricted substantially to elements having spectral distributions similar to those at the transmitter if the full range of the colors analyzed at the transmitter is to be reproduced at the receiver.

It is an object of the invention to provide a dot-sequential or simultaneous method of transmitting a color television image which is significantly simplified in mode of operation and in equipment required, and which at the same time brings about a substantial improvement of the quality of the transmitted image.

A furher object of the invention is to provide a color television system of the instantaneous type which system provides a truly panchromatic signal for a monochrome receiver and which avoids interference patterns at such a monochrome receiver.

Another object of the invention is to provide a color television system wherein the color image at the transmitter is analyzed into three color component signals which permit considerable freedom in the selection of the characteristics of the primary color reproducing elements at the receiver.

These and further objects of the invention will appear as the specification progresses.

In accordance with the invention, the foregoing objects are achieved in a color television system wherein the image to be televised is defined by three color component signals, by so correlating the spectral distribution characteristics of the signal generating elements at the transmitter that one of the signals is proportional to the energy distribution of the light emitted by the image as weighted by a first color mixture curve having a shape and ordinate scale substantially identical to the shape and ordinate scale of the curve of the relative luminosity of the spectral colors to the eye, and the second and third signals are proportional to the energy distribution of the light emitted by the image as weighted by second and third color mixture curves having shapes and ordinate scales complementing the shape and ordinate scale of the first curve. By so correlating the spectral distribution characteristics of the signal generating elements, the important advantage is achieved that the above-mentioned first signal contains complete information concerning the detail and brightness of the image, whereby this signal may be used directly and without modification by the other two signals to produce a truly panchromatic image at a monochrome receiver. The further advantage is achieved that the three signals so produced contain complete information concerning the chromaticity of the image and are in a form allowing selection of the primary color reproducing elements at the receiver within a wide range and the energizing of such elements in a simple and inexpensive manner.

It is a further feature of the system of the invention that one of the signals may be utilized directly as one component of the color video wave without sampling or otherwise modifying the same except to the extent later to be pointed out, and the remaining two signals may be appropriately sampled and combined with the first signal in an interference free manner, whereby the desired color video wave is produced in a manner and utilizing apparatus which are simpler and more trouble free than heretofore necessary.

In another aspect of the invention, the three color signals are so combined at the transmitter that interference arising in the transmission path is manifested to only a minor degree at the receiver. More particularly, the invention permits a combination of the first signal with the second and third signals whereby, in the absence of color in the televised image, i.e., during the white or gray portions of the image, the component of the color video wave which is produced by the sampling operation, is reduced to zero so that any interference normally impressed on this component may be readily discriminated against at the receiver.

The invention will be described in greater detail with reference to the appended drawings forming part of the specification and in which.

Figure 1:
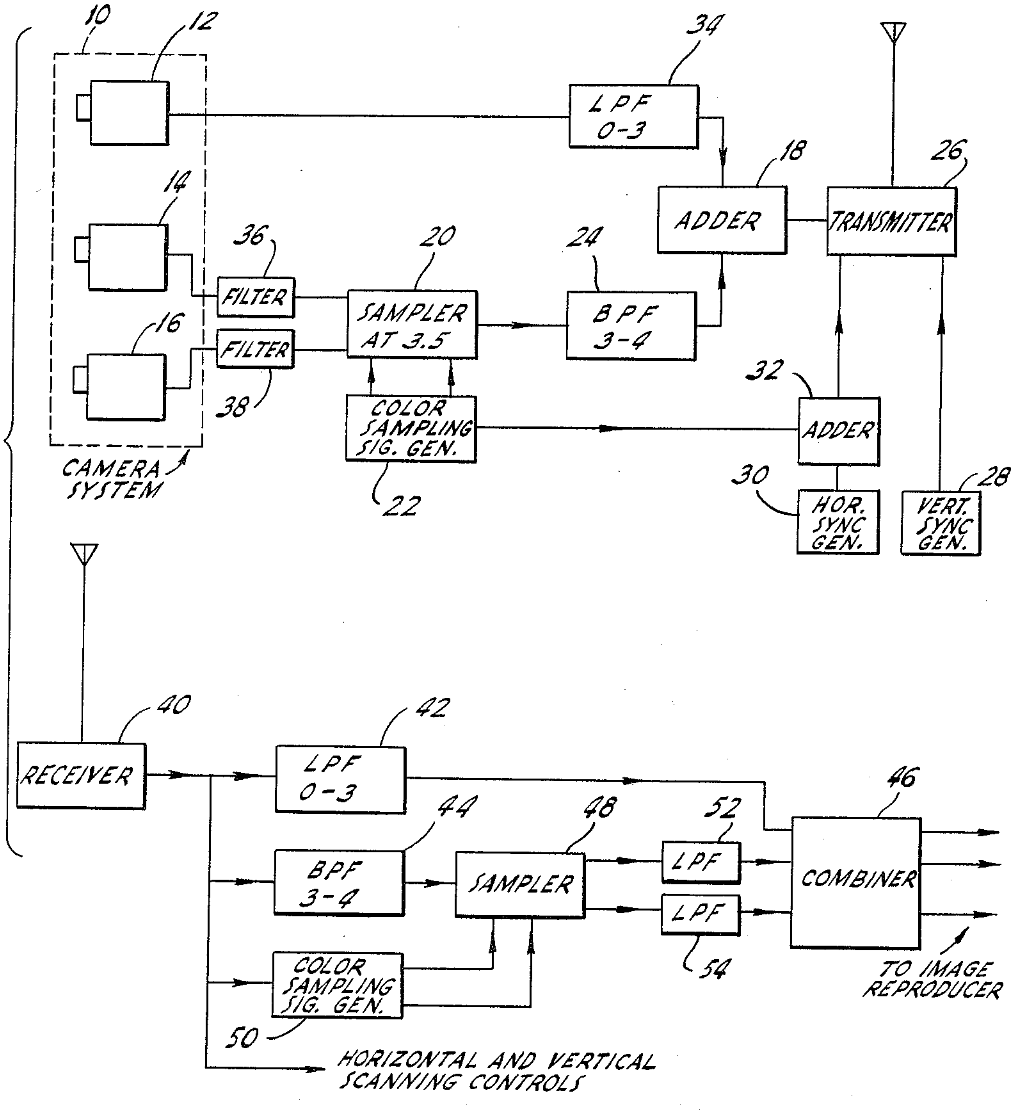
FIGURE 1 is a block diagram of a color television system in accordance with the invention.
Figure 3:
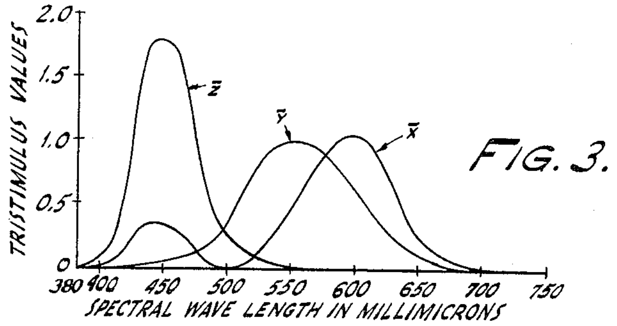
FIGURE 3 is a graph showing the spectral response characteristics of a camera system in accordance with a preferred embodiment of the invention.

Referring to FIGURE 1, the embodiment there shown comprises a color image pick-up camera system 10 adapted to resolve the image to be televised into three color component signals, and which, for the purposes of simplification and clarity, has been shown to be constituted by individual camera units 12, 14 and 16. In accordance with the invention, the three color signals derived from the camera system 10 are so correlated that one of the signals is proportional to the energy distribution of the light emitted by the image as weighted by a color mixture curve having a shape and ordinate scale substantially identical to the shape and ordinate scale of the curve of the relative luminosity of the spectral colors to the eye, and the second and third signals are proportional to the image light energy distribution as weighted by second and third color mixture curves complementing and defining, with the first color mixture curve, the chromaticity of the image. In the system shown in FIGURE 1 the above-noted first signal may be produced by a camera unit 12 having a spectral response proportional to the spectral luminosity of the eye and produced, for example, by means of an appropriate light filter arranged in the optical path of the camera unit and having a spectral transmission characteristic as shown in FIGURE 3 by the curve $\bar{y}$. The shape and ordinate scale of the curve $\bar{y}$, as well as the relative luminosity curve to which curve $\bar{y}$ corresponds, may readily be determined from the known literature and in this connection attention is directed to the work of the International Commission on Illumination, the pertinent portions of which are found in "Principles of Physics" by F. W. Sears published in 1946 by Addison-Wesley Press, Inc., of Cambridge, Massachusetts on page 305 et seq. thereof.

Since the transmission characteristic indicated by the curve $\bar{y}$ is identical to the curve of the relative luminosity of the spectrum colors to the eye, the signal produced by the camera unit 12 embodies all of the brightness information contained in the image. Accordingly, this signal alone is sufficient to produce a truly panchromatic image when applied to a monochrome receiver.

In order to provide second and third signals necessary to establish the chromaticity of the image, the camera units 14 and 16 are given spectral transmission characteristics which complement the spectral transmission characteristic of the camera unit 12. While a relatively wide freedom is permissible in the selection of the spectral characteristics of the camera units 14 and 16, in the preferred embodiment of the invention, the transmission characteristics of the camera units 14 and 16 conform to color mixture curves having solely positive distribution coefficients and having shapes and ordinate scales substantially identical to the color mixture curves established by the International Commission on Illumination as being complementary to the above noted curve $\bar{y}$ of FIGURE 3. These complementary color mixture curves have been shown as $\bar{x}$ and $\bar{z}$ in FIGURE 3 in conformance with the nomenclature established by the International Commission on Illumination.

With specific reference to FIGURE 3, it will be noted that the curve $\bar{y}$ has a peak value in the region of the 550 millimicron spectral line, the curve $\bar{z}$ has a peak value in the vicinity of the 450 millimicron spectral line, and the curve $\bar{x}$ has a major peak in the vicinity of the 600 millimicron spectral line and a minor peak in the vicinity of the 450 millimicron spectral line.

The design of suitable optical filters for imparting spectral response characteristics to camera units 12, 14 and 16 in conformance with the curves $\bar{x}$, $\bar{y}$ and $\bar{z}$ shown in FIGURE 3 is well known to those skilled in the art. For the sake of completeness, however, reference is made to the publication of the National Bureau of Standards Circular No. C429 of July 30, 1942 entitled "Photoelectric Tristimulus Colorimetry With Three Filters" by R. S. Hunter disclosing design factors for such filters.

In the preferred form of the invention the color component signal proportional to the energy distribution of the image light as weighted by the curve $\bar{y}$ is transmitted substantially unmodified whereas the color component signals as weighted by the curves $\bar{x}$ and $\bar{z}$ are subjected to a sampling operation and combined with the first unmodified signal to produce a resultant video wave having the desired information defining the luminosity and chromaticity of the image to be televised. Thus, in the system shown in FIGURE 1, the signal produced by the camera unit 12 is applied directly to an adder 18, whereas the signals produced by the camera units 14 and 16 are first applied to a sampler 20 and thereafter combined with the signal from the camera unit 12 in the adder 18.

The sampler 20, which operates to sample each of the component signals from the camera units 14 and 16 at spaced time intervals, may consist, for example, of two dual grid sampling tubes having one of their respective grids connected individually to the output of the respective camera units 14 and 16 and having their anodes connected in common. The sampling tubes are operated in sequence and at the desired sampling frequency rate, and for this purpose the sampler 20 is energized by a color sampling signal generator 22 which supplies appropriately phased synchronous voltages which may be applied to the second grids of the sampling tubes of the sampler 20. In one suitable form the generator 22 may consist of an oscillator having appropriate phase shifting networks from which are derived the phase displaced sampling signals for the sampler 20.

The sampler 20 may take the form of a synchronous switch which selectively connects the respective input circuits to the common output circuit thereof. In such an arrangement the sampling tubes are made alternately conductive at the positive peak of the sampling signal applied thereto and the output wave is basically constituted by a series of groups of two pulses, each having an amplitude proportional to the instantaneous amplitude of the respective component signal applied to the input circuits and each group having a repetition rate at the sampling frequency. Alternately, the sampler 20 may take the form of a balanced modulation system whereby, at the output thereof, there is formed a modulated wave having sideband components, the amplitude and spectrum of which are proportional to the amplitude and spectrum of the applied component signals. When the frequency of the sampling signals is sufficiently high relative to the maximum frequency of the spectrum of the component signals, the synchronous switching form and modulating form of the sampler 20 are equivalent and the composite signal produced by the sampler is the same in both instances.

Preferably, and in order to bring about a minimum of reaction between the respective component signals, the sampling signals from the generator 22 bears a 90° phase relationship whereby the sampling tubes are energized in quadrature and there are produced, at the output of the sampling tubes, two quadrature related modulated voltages. The quadrature related modulated voltages combine in the common output of the sampler to produce a resultant modulated voltage having phase and amplitude variations as determined by the amplitude variations of the input component signals.

To remove the low frequency components of the composite signal at the output of the sampler 20 and thereby restrict the same to the modulation products thereof, there may be interposed between the sampler 20 and the adder 18 a band pass filter 24, the freqency passband of which embraces the frequency at which the samples are taken.

The resultant video wave at the output of the adder 18 is constituted by a first component which is similar in frequency spectrum and in amplitude variations to the signal produced by the camera unit 12. The video wave is further constituted by a second component consisting of a subcarrier wave at the sampling frequency modulated by the signals produced by the camera units 14 and 16, the latter component occupying a frequency spectrum at one end of the spectrum of the first component.

The output wave of the adder 18 may be applied to a transmitter 26 to modulate the same in well known manner. In conformance with standard practice there may also be coupled to the transmitter 26 a suitable source 28 of vertical scanning synchronizing pulses and a source 30 of horizontal scanning synchronizing pulses, the latter being coupled to the transmitter through an adder 32 by means of which a suitable control signal, such as a color burst signal, may be applied to the horizontal synchronizing pulses to provide a color phasing reference signal.

In the system so far described, the spectrum of the signal from the camera unit 12 may overlap the spectrum of the modulated signal from the sampler 20. In order to avoid the possibility of crosstalk and in view of the remarks made above based on the finding that the eye is relatively insensitive to detail in small color areas, the frequency range of the signals from the camera units 14 and 16 may be limited to a value only necessary to provide visually acceptable information at the receiver concerning the chromaticity of the image. This may be effected by low pass filters 36 and 38 coupled to the outputs of camera units 14 and 16 respectively. In practice, it has been found that filters 36 and 38 may each have passbands of the order of 0–0.5 mc./sec. without significant visual deterioration of the color image. When using the specific values of passband for the filters as above given, the passband of the filter 24 may be from 3 to 4 mc./sec., when using a sampling frequency of approximately 3.5 mc./sec. and a low pass filter 34 having a passband of 0–3 mc./sec. may be included in the output of the camera unit 12.

As shown in FIGURE 1 and as pointed out above, the signal from the camera unit 12 is transmitted without modifying the same. It will be recognized, however, that since this signal also serves as a luminosity signal and thereby carries the brightness detail of the image, it may be suitably modified to increase the detail range thereof. For example, the signal may be modified in accordance with well known dot-interlacing principles whereby the effective detail of the televised image is increased.

At the receiver location there is provided a receiver 40 comprising the usual and conventional radio frequency amplifier, converter, intermediate frequency amplifier and detector stages whereby a video wave is produced containing the line and field synchronizing components, the image signal, and the color phasing signal produced at the transmitter. The line and field synchronizing components are applied to horizontal and vertical scanning control systems for an image reproducing system (not shown) in conventional manner, and a further description or illustration of this portion of the receiving system is therefore believed to be unnecessary.

As above pointed out, the image signal at the transmitter comprises a first component which has a frequency spectrum of extended bandwidth and which is proportional to the energy distribution of the light emitted by the image as weighted by a color mixture curve substantially identical to the curve of the relative luminosity of the spectral colors to the eye, and comprises a second component having a frequency spectrum centered about a subcarrier frequency arranged at one end of the spectrum of the first component and determining with the first component the luminosity and chromaticity of the image. By means of a low pass filter 42 and a band pass filter 44 at the receiver the respective first and second components are separated into individual channels, the signal appearing at the output of the filter 42 being substantially of the form of the signal at the output of filter 34 at the transmitter and the signal at the output of filter 44 being substantially of the form of the signal appearing at the output of filter 24 of the transmitter. Since all of the brightness detail of the image is contained in the signal derived from low pass filter 42, this signal may be applied directly to the picture reproducing system of a monochrome receiver having compatible operating standards and will produce in such a monochrome receiver a truly panchromatic image free of interference from the modulated component of the video wave.

The output signal from the band pass filter 44 is applied to a sampler 48 to derive therefrom two color component signals similar to those applied to sampler 20 of the transmitter. Sampler 48 operates to sample the signal applied thereto at spaced time intervals and may consist for example of two dual grid sampling tubes having one of their respective grids connected in common to the output of filter 44 and having their anodes connected to individual load impedances. The sampling tubes are actuated in sequence at the frequency of the subcarrier of the applied signal and in proper phase relationship by appropriate signals which may be applied to the second grids thereof and are derived from a color sampling signal generator 50. Alternatively, the sampler 48 may take the form of a modulation system as previously described in connection with the sampler 20 of the transmitter portion of the system. In either instance, the sampler 48 is energized in synchronism with the sampling operation at the transmitter.

The generator 50 may consist of an oscillator having appropriate phase shifting networks from which are derived the phase displaced sampling signals for the sampler 48, and is held in phase and frequency synchronism with the subcarrier frequency of the sampled signal by means of a color marker signal applied thereto and derived from the received video wave. Oscillators of the type under consideration are well known and a suitable form thereof is shown and described in the copending application of Joseph C. Tellier, Serial No. 197,551, filed November 25, 1950.

The two signals so produced by the sampler 48 are applied to individual low pass filters 52 and 54 by means of which undesirable frequency components of the demodulation process are removed.

While the passbands of the filters 42 and 44 may overlap to a certain extent, preferably these filters are arranged to provide two mutually exclusive passbands in order to minimize crosstalk or other interference between the first signal component and the modulated second signal component. Thus the filter 42 may have a cut-off frequency at 3 mc./sec. as in the case of the filter 34 and the filter 44 may have a passband of 3–4 mc./sec. as in the case of the filter 24.

The three color component signals so produced are applied to a combiner 46, the function of which is to blend appropriate amounts of the three signals applied thereto so as to produce three output color signals matching the particular primary color system utilized in the color image reproducer of the receiver. More particularly, by means of the combiner 46, which may consist of a matrix network of three channels suitably cross-connected, the color system based on color mixture curves as shown by the curves $\bar{x}$, $\bar{y}$ and $\bar{z}$ of FIGURE 3 and defined by the three color component signals applied to the combiner 46, is transposed into the particular primary color system of the reproducer utilized at the receiver.

Figure 2:
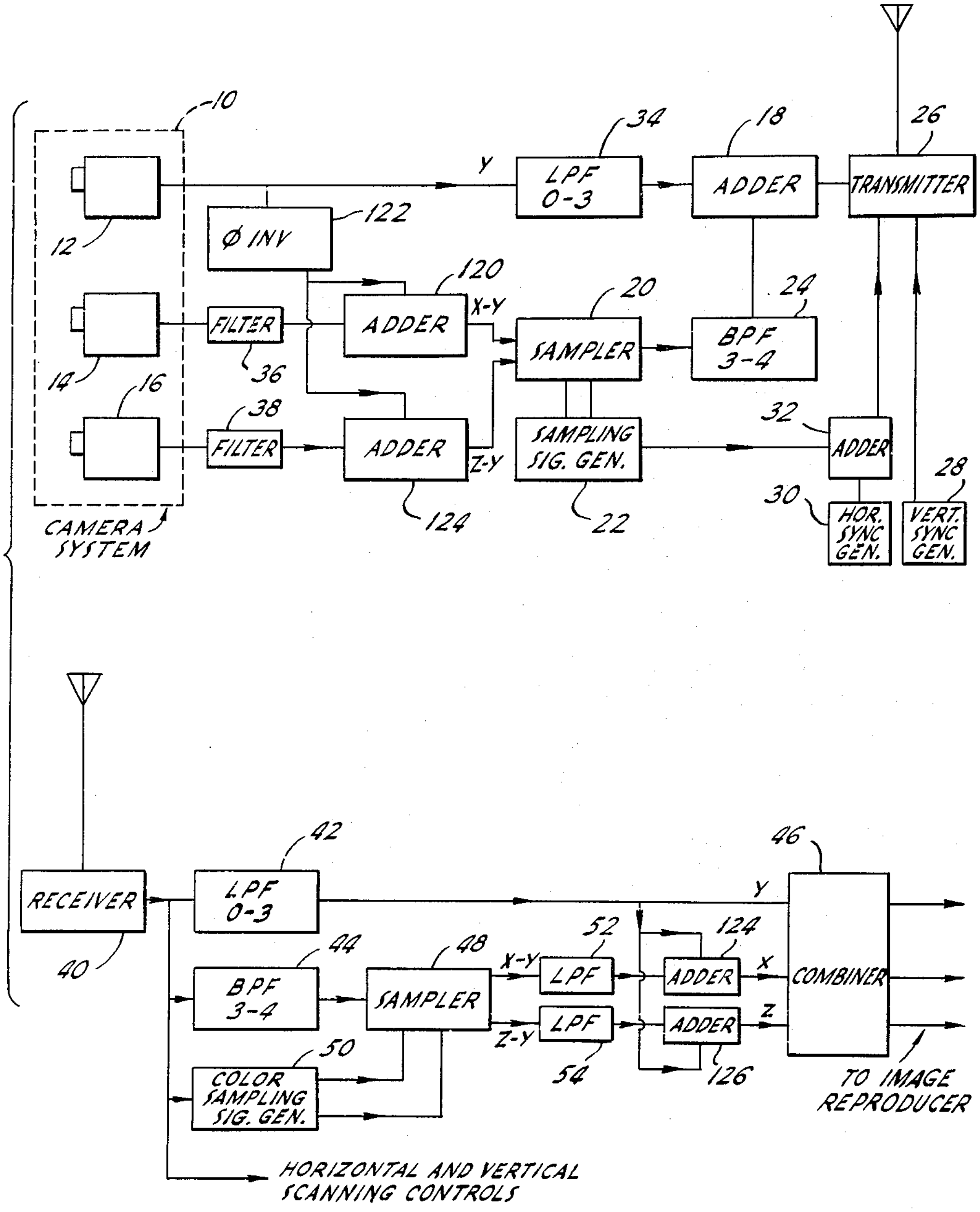
FIGURE 2 is a block diagram of a color television system illustrating another embodiment of the invention.

The arrangement shown in FIGURE 2 comprises a camera system 10 having individual camera units 12, 14 and 16 adapted to produce three color component signals defining the luminosity and chromaticity of the image to be televised. As in the case of the system of FIGURE 1, camera unit 12 has a spectral response characteristic producing a first signal proportional to the energy distribution of the light emitted by the image as weighted by a color mixture curve substantially identical to the curve of relative luminosity of the eye, and camera units 14 and 16 have spectral response characteristics producing signals based on color mixture curves complementary to the curve defining the first signal. The color mixture curves complementing the color mixture curve of the first signal conform to the requirements previously set forth and are preferably of the shape and distribution shown in FIGURE 3 as curves $\bar{x}$ and $\bar{z}$. The respective three signals have been indicated as X, Y and Z in FIGURE 2. In accordance with the principles of the invention as shown in FIGURE 2, the signal Y from the camera unit 12 is combined with each of the signals X and Z from the camera units 14 and 16 respectively, to produce two difference signals which in turn are sampled in an appropriate manner to produce a modulated component of the video wave having a frequency spectrum arranged at one end of the spectrum of the signal Y produced by camera unit 12. More particularly, the signal from the camera unit 12 is applied to an adder 120 through a phase inverter 122 together with the signal from the camera unit 14 to produce a first difference signal indicated as $X-Y$. In similar fashion the signal from the phase inverter 122 is applied to an adder 124 together with the signal from camera unit 16 to produce a second difference signal indicated as $Z-Y$. Since the signal Y from the camera unit 12 contains all of the detail brightness information of the image to be televised and only a relatively small amount of information concerning chromaticity is required by the eye, the signals from the camera units 14 and 16 may be restricted in their frequency range without significant visual deterioration of the color image at the receiver. In view thereof low pass filters 36 and 38 having a maximum passband of the order of 0.5 mc./sec., may be included in the outputs of the camera units 14 and 16 respectively.

The two difference signals so produced are subjected to a sampling operation by means of a sampler 20 energized by a sampling signal generator 22 and the resultant modulated signal is applied to the band pass filter 24. The modulated signal appearing at the output of filter 24 is combined with the Y signal from camera unit 12 by means of the adder 18 in the same manner previously described in connection with FIGURE 1. Similarly, as in the system of FIGURE 1 the output of the adder 18 is used to modulate a transmitter 26 to which are also applied horizontal and vertical synchronizing pulses and a color phasing marker signal derived from the generators 30, 28 and 22, respectively.

At the receiver position, the video wave comprising the horizontal scanning synchronizing signals, the picture image signals and the color phasing signal is derived from a receiver 40. The horizontal and vertical scanning synchronizing signals are separated from the video wave and applied to suitable scanning control means for the image reproducer in well known manner. Since the image reproducer and the scanning controls therefor are conventional, the illustration and description of the same is considered to be unnecessary.

By means of a low pass filter 42 and a band pass filter 44 the image signal is separated in a first component corresponding to the signal derived from the low pass filter 34 at the transmitter and a modulated component corresponding to the modulated signal derived from the filter 24 at the transmitter. The signal component derived from the filter 44 is first supplied to a sampler 48 actuated by a color sampling signal generator 50 which is coupled to the receiver 40 and is synchronized in frequency and phase by means of the marker signal contained in the video wave. The output of the sampler 48 corresponds to the input of the sampler 20 at the transmitting position and the two difference signals so formed and indicated as $X-Y$ and $Z-Y$ are in turn combined with the signal Y from the output of filter 42 by means of adders 124 and 126, respectively, to produce signals denoted by X and Z respectively. By means of a combiner 46 to which the three signals X, Y and Z are applied, a blending of the signals is produced adapting them to the particular primary color system utilized at the image reproducer of the receiver.

Various elements of the systems of FIGURES 1 and 2 may be of the same form and operate in the same manner. For purposes of simplification and clarity the respective elements have been indicated by the same numerals.

As previously pointed in the signal Y derived from the camera unit 12 of the systems of FIGURES 1 and 2 is proportional to the energy distribution of the light emitted by the image as weighted by a color mixture curve which is substantially identical to the curve of relative luminosity of the spectral colors to the eye. Accordingly, this signal contains all of the detail brightness information required by the eye and any information present in the signals X and Z derived from the camera units 14 and 16 arising as a result of detail brightness of the original is redundant. By means of the sampling process to which the signals X and Z are subjected and the subsequent filtering of the sampled signals by the filter 24 the unwanted low frequency modulation products are removed so that the modulated wave at the output of the filter 24 is a signal with no luminosity information and contains only chromaticity information. Accordingly, in the subsequent reception of the composite video wave, any interference superimposed on the modulated wave in the transmission medium will be interpreted by the receiver as chromaticity information and will be so reproduced as a change in the chromaticity of the reproduced image, which change is considerably less noticeable to the eye than a change in brightness. Moreover, since the modulated signal at the output of filter 24 establishes the chromaticity of the image for a given value of the luminosity, the bandwidth of this signal may be reduced to a relatively small value without significant visual deterioration of the image thereby reducing the overall required bandwith of the transmitted video signal.

A further advantage of the system of FIGURE 2 is that under conditions of white or gray transmission, the color signals X, Y and Z from the respective camera units are equal in value, and therefore, the difference signals $X-Y$ and $Z-Y$ become zero. Under these conditions the modulated subcarrier is reduced to zero, and the possibility of interaction between the video wave components producing dot patterns in the reproduced image is avoided. Similarly, with light pastel shades of colors of the image, wherein the color components are substantially desaturated so as to approximate white or gray, the amplitude level of the modulated wave component will be small and less likely to interfere with the luminosity component of the video wave and produce objectionable interference patterns in the reproduced image.

While I have described my invention by means of specific examples and in specific embodiments, I do not wish to be limited thereto for obvious modifications will occur to those skilled in the art without departing from the spirit and scope of the invention.

What I claim is:

1. An electrical system for transmitting a color television image comprising means having a light input channel and having first, second and third electrical output channels, said means including a camera system for scanning successively arranged elements of said image and comprising between said input channel and said first output channel an electro-optical transmission path having a transfer characteristic in the form of a first color mixture curve having a shape and ordinate scale substantially identical to the shape and ordinate scale of the curve of relative luminosity of the spectral colors to the eye thereby to produce at said first output channel a first signal proportional to the energy distribution of light emitted by the elements of said image as weighted by the said first color mixture curve, said means further comprising between said input channel and said second and third output channels electro-optical transmission paths having transfer characteristics in the form of second and third color mixture curves having shapes and ordinate scales complementing the shape and ordinate scale of said first curve and defining with said first curve the chromaticity of the image elements thereby to produce at said second and third output channels second and third signals proportional to the energy distribution of light emitted by the elements of said image as weighted by said second and third color mixture curves respectively, means to amplitude modulate a first carrier wave in accordance with amplitude variations of said second signal, said first carrier wave having a given frequency value arranged at one end of the frequency spectrum of said first signal and having a given phase position, means to amplitude modulate a second carrier wave in accordance with amplitude variations of said third signal, said second carrier wave having said given frequency value and having a phase position displaced relative to the phase position of said first carrier wave, and means to combine said first signal and said amplitude modulated carrier waves thereby to produce a composite video wave indicative of the luminosity and chromaticity of the said successively scanned elements of said image.

2. An electrical system as claimed in claim 1 further comprising means to limit the frequency bandwidth of said second and third signals and wherein the frequency spectrum of the modulated carrier wave components of said composite video wave is substantially contiguous to and arranged at the high frequency end of the frequency spectrum of said first signal.

3. An electrical system as claimed in claim 1 wherein said second and third color mixture curves have solely positive coefficients throughout the spectral range and define areas substantially equal to the area defined by said first curve.

4. An electrical system as claimed in claim 1 wherein said first, second and third color mixture curves have substantially the shape and form of the standard color mixture curves established by the International Commission on Illumination.

5. An electrical system as claimed in claim 1, wherein said means to amplitude modulate said first carrier wave in accordance with amplitude variations of said second signal comprises means to algebraically add said first and second signals to produce a first difference signal and means to amplitude modulate said first carrier wave proportional to the amplitude of said first difference signal, and wherein said means to modulate said second carrier wave in accordance with amplitude variations of said third signal comprises means to algebraicially add said first and third signals to produce a second difference signal and means to amplitude modulate said second carrier wave proportionally to the amplitude of said second difference signal.

6 An electrical system for transmitting a color television image comprising means having a light input channel and having first, second and third electrical output channels, said means including a camera system for scanning successively arranged elements of said image and comprising between said input channel and said first output channel an electro-optical transmission path having a transfer characteristic in the form of a first color mixture curve having a shape and ordinate scale substantially identcal to the shape and ordinate scale of the curve of relative luminosity of the spectral colors to the eye thereby to produce at said first output channel a first signal proportional to the energy distribution of light emitted by the elements of said image as weighted by said first color mixture curve, said means further comprising between said input channel and said second and third output channels electro-optical transmission paths having transfer characteristics in the form of second and third color mixture curves having shapes and ordinate scales complementing the shape and ordinate scale of said first curve and defining with said first curve the chromaticity of the image elements thereby to produce at said second and third output channels second and third signals proportional to the energy distribution of light emitted by the elements of said image as weighted by said second and third color mixture curves respectively, means to limit the frequency spectrum of said first signal to a given maximum value, means to limit the frequency spectra of said second and third signals to given predetermined values, means to amplitude modulate a first carrier wave in accordance with amplitude variations of said frequency limited second signal, said first carrier wave having a given frequency value approximating the said given maximum frequency value of the frequency spectrum of said first signal and having a given phase position, means to amplitude modulate a second carrier wave in accordance with amplitude variations of said frequency limited third signal, said second carrier wave having a frequency value equal to the frequency value of said first carrier wave and having a phase position substantially in quadrature to the phase position of said first carrier wave, and means to combine said first signal and said amplitude modulated carrier waves to thereby produce a composite video wave indicative of the luminosity and chromaticity of the said successively scanned elements of said image.

7. An electrical system as claimed in claim 6 wherein said frequency limited second and third signals are applied to said modulating means without prior modification.

8. An electrical system as claimed in claim 6 wherein said means to amplitude modulate said first carrier wave in accordance with amplitude variations of said second signal comprises means to algebraically add said first and second signals to produce a first difference signal and means to amplitude modulate said first carrier wave proportionally to the amplitude of said first difference signal, and wherein said means to modulate said second carrier wave in accordance with amplitude variations of said third signal comprises means to algebraically add said first and third signals to produce a second difference signal and means to amplitude modulate said second carrier wave proportionally to the amplitude of said difference signal.

9. An electrical system for receiving a video wave having first and second components thereof indicative of the luminosity and chromaticity of a color television image, said first component defining a first color signal having a first frequency spectrum band of given maximum extent and being proportional to the energy distribution of light emitted by successively scanned elements of said image as weighted by a first color mixture curve having a shape and ordinate scale substantially identical to the shape and ordinate scale of the curve of relative luminosity of the spectral colors to the eye and said second component being in the form of a modulated wave having a frequency spectrum arranged adjacent one end of said first frequency spectrum band, said modulated wave comprising a first amplitude modulated carrier wave component having a given phase position and having amplitude variations as determined by a second color signal and a second amplitude modulated carrier wave component having the same frequency as the first carrier wave component, having a phase position displaced relative to the phase position of said first carrier wave and having amplitude variations as determined by a third color signal, said second and third color signals being proportional to the energy distribution of light emitted by successively scanned elements of said image as weighted by second and third color mixture curves having shapes and ordinate scales complementing the shape and ordinate scale of said first curve to define therewith the chromaticity of said image elements, said system comprising means to separate said first and second component of the video wave, means to combine said modulated wave with a first detection wave having a frequency equal to the frequency of said first carrier wave component and having a given phase position to thereby derive said second color signal, means to combine said modulated wave with a second detection wave having a frequency equal to the frequency of said first detection wave and having a phase position displaced relative to that of said first detection wave to thereby derive said third color signal, and means to combine said separated first component signal and said second and third derived color signals to produce three signals each indicative of a different one of three primary color components of the color contents of successive elements of said image.

10. An electrical system as claimed in claim 9 wherein said means to derive said first component of said video wave and said second and third derived signals comprises, a first transmission path including a low pass filter system having a bandwidth substantially equal to said first frequency spectrum band and a second transmission path including a band pass filter system having a bandwidth substantially equal to said second frequency spectrum band.

11. An electrical system as claimed in claim 9 wherein said second and third derived color signals are difference signals with said first component of the video wave and wherein said means to combine said first component of the video wave and said second and third derived color signals, comprises means to combine said first component of the video wave and one of said difference signals to produce a first resultant signal, means to combine said first component of the video wave and the other of said difference signals to produce a second resultant signal, and a matrix system for combining said first component of the video wave and said two resultant signals to produce three signals each indicative of a respective one of three primary color components of the color content of said image.

12. An electrical system for transmitting a color television image comprising means having a light input channel and having first, second and third electrical output channels, said means including a camera system for scanning successively arranged elements of said image and comprising between said input channel and said first output channel an electro-optical transmission path having a transfer characteristic in the form of a first color mixture curve having a shape and ordinate scale substantially identical to the shape and ordinate scale of the curve of relative luminosity of the spectral colors to the eye thereby to produce at said first output channel a first signal proportional to the energy distribution of light emitted by the elements of said image as weighted by the said first color mixture curve, said means further comprising, between said input channel and said second and third output channels, electro-optical transmission paths having transfer characteristics in the form of second and third color mixture curves having shapes and ordinate scales complementing the shape and ordinate scale of said first curve and defining with said first curve the chromaticity of the image elements thereby to produce at said second and third output channels second and third signals proportional to the energy distribution of light emitted by the elements of said image as weighted by said second and third color mixture curves respectively, a source of a carrier wave having a frequency located above a frequency ranges of said second and third signals, means responsive to said second signal to amplitude modulate said carrier wave in accordance with the amplitude variations of said second signal and in a predetermined phase relationship, means responsive to said third signal to amplitude modulate said carrier wave in accordance with the amplitude variations of said third signal and in a different phase relationship, and means for combining said first signal with said amplitude modulated carrier wave to produce a composite video wave indicative of the luminosity and chromaticity of said successively scanned elements of said image.

References Cited by the Examiner

UNITED STATES PATENTS

| | | | |
|---|---|---|---|
| 2,303,898 | 12/1942 | Anderson | 178—5.4 |
| 2,492,926 | 12/1949 | Valensi | 178—5.2 |
| 2,554,693 | 5/1951 | Bedford | 178—5.2 |
| 2,558,489 | 6/1951 | Kalfaian | 178—5.2 |
| 2,566,707 | 9/1951 | Sziklai | 178—5.4 |
| 2,580,903 | 1/1952 | Evans | 178—5.2 |
| 2,594,715 | 4/1952 | Angel | 178—5.2 |
| 2,750,439 | 6/1956 | Kell | 178—5.4 |

FOREIGN PATENTS

| | | |
|---|---|---|
| 689,356 | 3/1953 | Great Britain. |

DAVID G. REDINBAUGH, *Primary Examiner.*

NEWTON N. LOVEWELL, STEPHEN W. CAPELLI, *Examiners.*